United States Patent
Otsuka

(10) Patent No.: US 8,848,206 B2
(45) Date of Patent: Sep. 30, 2014

(54) IMAGE FORMING APPARATUS AND IMAGE FORMING SYSTEM

(75) Inventor: Naoki Otsuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 142 days.

(21) Appl. No.: 13/419,644

(22) Filed: Mar. 14, 2012

(65) Prior Publication Data

US 2012/0236350 A1   Sep. 20, 2012

(30) Foreign Application Priority Data

Mar. 18, 2011   (JP) ................................ 2011-060445

(51) Int. Cl.
*G06F 1/26* (2006.01)
*G06F 15/16* (2006.01)
*G06F 3/12* (2006.01)
*H04N 1/00* (2006.01)

(52) U.S. Cl.
CPC .......... *H04N 1/00244* (2013.01); *G06F 3/1221* (2013.01); *G06F 3/1229* (2013.01); *H04N 1/00904* (2013.01); *Y02B 60/1267* (2013.01); *Y02B 60/1271* (2013.01); *H04N 1/00896* (2013.01); *H04N 2201/0094* (2013.01); *G06F 3/1285* (2013.01)
USPC ............................ 358/1.13; 713/320; 709/218

(58) Field of Classification Search
CPC .... G06F 3/1221; G06F 3/1229; G06F 3/1285
USPC ........................... 358/1.13; 713/320; 709/218
See application file for complete search history.

(56) References Cited

U.S. PATENT DOCUMENTS

2006/0265473 A1* 11/2006 Muto ........................... 709/218
2011/0185201 A1* 7/2011 Kawakami et al. ........... 713/320

FOREIGN PATENT DOCUMENTS

JP     A-2005-193560     7/2005

* cited by examiner

*Primary Examiner* — Douglas Tran
*Assistant Examiner* — Justin Katzwhite
(74) *Attorney, Agent, or Firm* — Muncy, Geissler, Olds & Lowe, P.C.

(57) ABSTRACT

An image forming apparatus includes a communication part that performs communication with an external device; an image processing part that processes image data that is received by the communication part and that is for forming an image; an image forming part that forms an image of the image data processed in the image processing part; and a power supply controller that controls power supplied to the communication part, the image processing part, or the image forming part. The communication part includes a memory part that stores status information of the image forming apparatus, and a server part that performs communication with the external device, and the power supply controller supplies power to only the communication part in a power saving mode during a standby period, and the server part responds to a status information reference request and a status information update request from the external device.

16 Claims, 18 Drawing Sheets

| Device-Specific Information | | | Parameter Examples |
|---|---|---|---|
| Large Classification | Medium Classification | Small Classification | |
| Remaining Amount of Consumable | Remaining Amount of Toner | Black | 20% |
| | | Cyan | 50% |
| | | Magenta | 30% |
| | | Yellow | 80% |
| | Remaining Amount of Drum | Black | 60% |
| | | Cyan | 40% |
| | | Magenta | 40% |
| | | Yellow | 40% |
| | Remaining Amount of Fuser | | 82% |
| | Remaining Amount of Transfer Belt | | 90% |
| Counter Information | Number of Sheets Printed | Color | 11141 |
| | | Monochrome | 7523 |
| | Number of Sheets Supplied | Front tray | 1350 |
| | | Tray 1 | 9562 |
| | | Tray 2 | 4325 |
| | | Tray 3 | 3427 |
| System Information | Firmware Version | Device Controller | 1.00A |
| | | Image Processing Part | 1.02C |
| | | Network Controller Part | 1.01B |
| | | Web Server | 1.01B |
| | Serial Number | | AA12345678 |

| Modifiable Information | | | Parameter Examples |
|---|---|---|---|
| Large Classification | Medium Classification | Small Classification | |
| Sheet Tray Setup | Sheet Supply Check | | ON |
| | Sheet Supply Tray Auto Change | | ON |
| | Tray Setup | Front Tray | Automatic |
| | | Tray 1 | Automatic |
| | | Tray 2 | B5 |
| | | Tray 3 | B4 |
| | Permission for Use | Front Tray | Enable |
| | | Tray 1 | Enable |
| | | Tray 2 | Enable |
| | | Tray 3 | Enable |
| Network Setup | Network | IP Address | 192.168.1.12 |
| | | MAC Address | 255.255.255.0 |
| | | Gateway | 192.168.1.254 |
| | Permission for Connection | IP Address | "*" |
| | | MAC Address | "*" |
| | Refusal for Connection | IP Address | - |
| | | MAC Address | - |
| Print Setup | Print Setup | Number of Copies | 1 |
| | | Double-Sided Printing | ON |
| | | Binding | Side Binding |
| | | Resolution | 600 dpi |
| | | Printing Speed | Normal |
| | | Toner Saving | OFF |
| | | Print Direction | Vertical |
| Color Mode | Density Setup | Black | +1 |
| | | Cyan | 0 |
| | | Magenta | 0 |
| | | Yellow | 0 |
| Device Management | | Allow use of USB | Enable |
| | | Allow use of LAN | Enable |
| | | USB Speed | High Speed |
| | | LAN Speed | 100Base-TX |
| | | Power Saving | ON |
| | | Power Saving Time | 30 min. |
| | | Administrator Password | ******** |

Fig. 3

IMAGE FORMING APPARATUS AND IMAGE FORMING SYSTEM

CROSS REFERENCE TO RELATED APPLICATION

The present application is related to, claims priority from and incorporates by reference Japanese Patent Application No. 2011-060445, filed on Mar. 18, 2011.

TECHNICAL FIELD

The present application relates to an image forming apparatus and an image forming system that allows referencing and updating status information to be made from other equipment connected to such a device.

BACKGROUND

In recent years, there have been an increasing number of cases where an image forming apparatus, such as a printer and the like, connected to a network, such as a local area network (LAN) and the like, is shared with multiple external devices connected to the same network, for example.

In such a situation, among the above-described image forming apparatus, there are those that have a power saving mode which restricts the power supply to components other than the startup controller for the purpose of reducing the power consumption during standby until a startup request is inputted for the print execution command (see JP Laid-Open Patent Application No. 2005-193560, for example).

However, in the image forming apparatus described in the above-described JP Laid-Open Patent Application No. 2005-193560, when a reference request or an update request for the status information of the image forming apparatus is made from an external device during the power saving mode, a main central processing unit (CPU) that has associated a large power consumption is used to respond to such a request. Therefore, reduction of power consumption is prevented.

The present application considers such a situation. An objective of the present application is to provide an image forming apparatus and an image forming system which allow reduction of power consumption even if a reference request or an update request for status information of the image forming apparatus is made from an external device during a power saving mode.

SUMMARY

In order to solve the objects, an image forming apparatus according to the present application includes a communication part that performs communication with an external device; an image processing part that processes image data that is received by the communication part and that is for forming an image; an image forming part that forms an image of the image data processed in the image processing part; and a power supply controller that controls power supplied to the communication part, the image processing part, or the image forming part. The communication part includes a memory part that stores status information of the image forming apparatus, and a server part that performs communication with the external device, and the power supply controller supplies power to only the communication part in a power saving mode during a standby period, and the server part responds to a status information reference request and a status information update request from the external device.

In addition, an image forming system according to the present application includes the above-described image forming apparatus and the external device that communicates with the image forming apparatus. The external devices includes a receiving part that receives the client application object, a display part that analyzes the received client application object and displays at least a part of the status information, an input part that accepts a modification to the status information displayed on the display part, and a sending part that sends the status information update request accepted via the input part to the image forming apparatus.

According to the present application, an image forming apparatus and an image forming system are provided which allow the reduction of power consumption even if a reference request or an update request for the status information of the image forming apparatus is made from an external device during the power saving mode.

BRIEF DESCRIPTION OF THE DRAWINGS

FIG. 3 is a schematic diagram showing an example of status information stored by a non-volatile memory.

DETAILED DESCRIPTION OF EMBODIMENTS

Embodiments of the present application are explained below with reference to the drawings. The present application is not limited to the below descriptions but may be appropriately modified without departing from the scope of the embodiments.

First Embodiment

The present embodiment is explained using an image forming system as an example, which is constructed by connecting a printer as an image forming apparatus that includes an electrographic print engine to a LAN network including multiple units of network devices as external devices.

Figure 1:
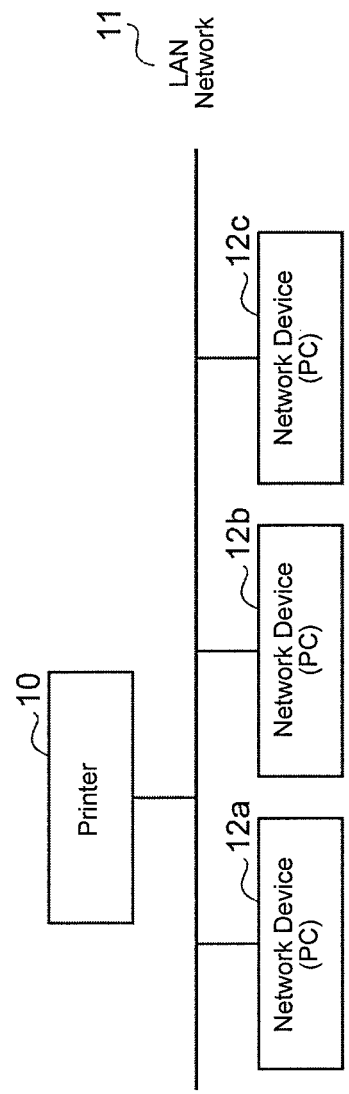
FIG. 1 is a figure explaining an example of a connection between a printer and a network device (PC) via a LAN network.

FIG. 1 is a figure explaining an example of a connection between a printer 10 of the present embodiment and network devices (PCs) 12a, 12b and 12c via a LAN network 11.

Here, the network devices (PCs) 12a, 12b, and 12c are external devices connected via the LAN network 11. In the present embodiment, the network devices (PCs) 12a, 12b, and 12c are assumed to be personal computers (PCs) that include at least a web browser. However, other forms of devices that include a web browser may be used.

Figure 2:
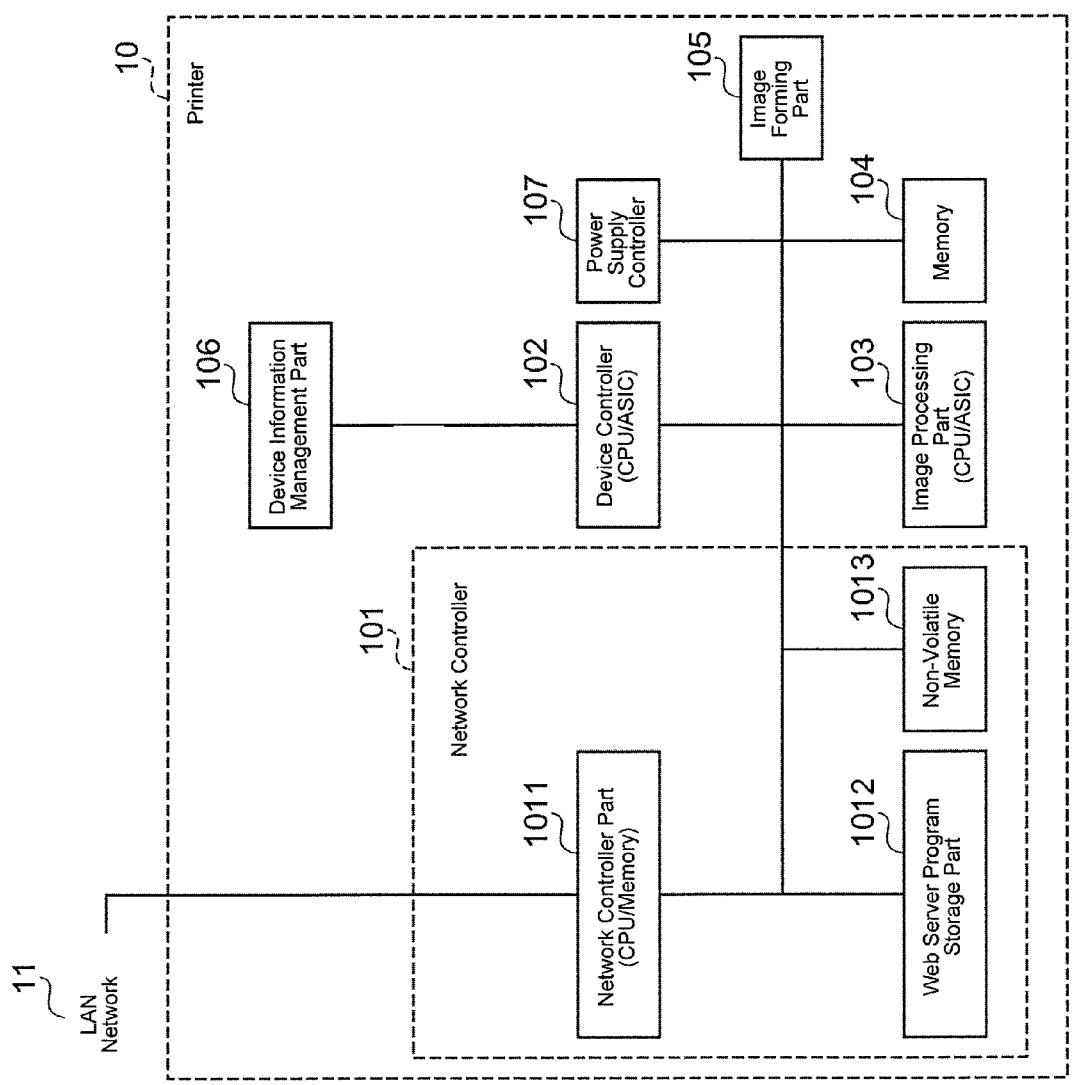
FIG. 2 is a schematic configuration diagram for explaining a configuration of the printer.

Next, a configuration of the printer 10 is explained with reference to FIG. 2. FIG. 2 is a schematic configuration diagram for explaining a configuration of the printer 10.

The printer 10 includes a network controller 101 as a communication part, a device controller (CPU/application specific integrated circuit (ASIC)) 102, an image processing part (CPU/ASIC) 103, a memory 104, an image forming part 105, a device information management part 106, and a power supply controller 107. In FIG. 2, the network controller 101 is shown to be provided inside the printer 10. However, the configuration is not limited to the configuration shown in FIG. 2, and the network controller 101 may be provided at any location in the LAN network 11 and communicate with the printer 10 as needed via the LAN network 11.

The network controller 101 includes a network controller part (CPU/memory) 1011, a web server program storage part 1012, and non-volatile memory 1013, and is connected to the LAN network 11. The network controller 101 receives print jobs according to the line printer daemon (LPR) protocol and the like from network device (PC) 12a, 12b, and 12c and responds to requests from the network devices (PC) 12a, 12b, and 12c on the LAN network 11, for example. In addition, the non-volatile memory 1013 as a memory part memorizes and stores status information relating to the printer 10.

The network controller part (CPU/memory) 1011 includes a CPU and a memory, analyzes transmission control protocol/Internet protocol (TCP/IP) packets flowing from the LAN network 11. As a result, the network controller part 1011 receives print jobs from the network devices (PC) 12a, 12b, and 12c on the LAN network 11 and responds to accesses requested from the network devices (PC) 12a, 12b, and 12c.

A web server program storage part 1012 stores a web server program for responding to web accesses from the network devices (PC) 12a, 12b, and 12c on the LAN network 11 and web content utilized by the web server program. The web server program is executed by a CPU inside the network controller part (CPU/memory) 1011. Specifically, the web server program is a simple program including the following three functions. First, the web server program includes a function to send a web application object to a specified web address upon a web access as a reference request for status information from the network devices (PC) 12a, 12b, and 12c. The web server program also includes a function to send status information stored in the non-volatile memory 1013 to the network devices (PC) 12a, 12b, and 12c upon a status information acquisition request from the network devices (PC) 12a, 12b, and 12c. The web server program further includes a function to write the received updated content to the status information stored in the non-volatile memory 1013 upon a status information update request from the network devices (PC) 12a, 12b, and 12c.

The web content is a web application object described in a language such as Java (registered trademark), Ajax and the like, and is executed on a web browser included in the network devices (PC) 12a, 12b, and 12c to make the reference request and the update request for the status information. Here, the web application object includes the following characteristics so as not to place a load on the network controller part 1011. First, all pages are embedded in advance in the web application object according to the present embodiment. Therefore, no web access occurs even if a page switching operation is performed for a reference request or update request for the status information on the web browser on the network devices (PC) 12a, 12b, and 12c. In addition, when the web application object is executed on the web browser on the network devices (PC) 12a, 12b, and 12c, the web browser sends the request to the printer 10 only once and obtains the status information of the printer 10. Moreover, if the status information is updated on the web application object, the updated information of the status information is sent to the printer 10 only when an "Apply" button on the web application object is pressed down. At this time, the sent and received status information is data itself of a fixed format stored in the non-volatile memory 1013, and encoding/decoding of the data is performed on the web application object side.

The non-volatile memory 1013 is a memory area for memorizing and storing the status information of the image forming apparatus so as to allow sending/receiving of the status information from and to the network devices (PC) 12a, 12b, and 12c while in the power saving mode. Because the non-volatile memory 1013 is non-volatile, the memorized content is retained even if the power supply to the image forming apparatus is cut off.

FIG. 3 is a schematic diagram showing an example of status information stored by a non-volatile memory 1013. First, device-specific information 1061a is updated according to operation state of the printer 10 of the present embodiment and is device-specific status information which cannot be modified by the user. Although the status information is classified into a large classification 1062a, a medium classification 1063a, and a small classification 1064a, the status information is integrally arranged in the non-volatile memory 1013 regardless of the classifications. Parameters corresponding to the respective classifications are listed as parameter examples 1065a.

Next, modifiable information 1061b is status information that can be modified by the user. Although the status information is also classified into the large classification 1062b, the medium classification 1063b, and the small classification 1064b in the same manner as the device-specific information 1061a, the status information is integrally arranged in the non-volatile memory 1013 regardless of the classifications.

Parameters corresponding to the respective classifications are listed as parameter examples 1065b.

Figure 4:
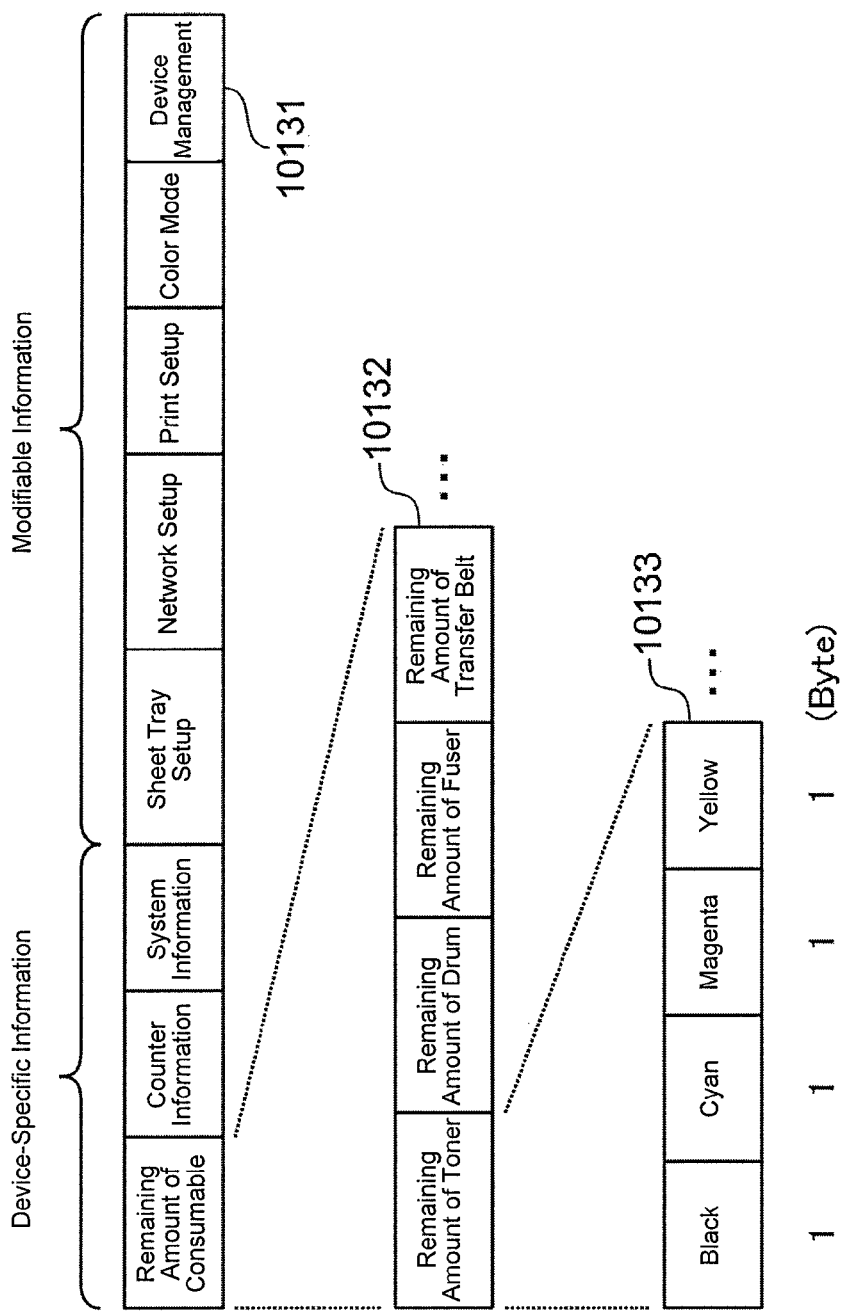
FIG. 4 is a schematic diagram showing an example of the order of the status information stored in the non-volatile memory.

FIG. 4 is a schematic diagram showing an example of the order of the status information stored in the non-volatile memory 1013. As shown in FIG. 4, the status information is arranged in the order of the device-specific information 1061a and the modifiable information 1061b. The details of the arrangement are in a large classification order 10131. Then, inside each large classification, the arrangement is in a medium classification order 10132, and inside each medium classification, the arrangement is in a small classification order 10133. The parameters of each small classification are secured by the necessary number of bytes.

The device controller part (CPU/ASIC) 102 includes a CPU or ASIC requiring larger power consumption than the CPU of the network controller part (CPU/memory) 1011 and centrally controls the entire device.

The image processing part (CPU/ASIC) 103 includes a CPU/ASIC requiring larger power consumption than the CPU of the network controller part (CPU/memory) 1011 and performs appropriate image processes for printing, such as color matching and dithering, to the print job received by the network controller part (CPU/memory) 1011.

The memory 104 is a memory for storing a print job received by the network controller part (CPU/memory) 1011, securing a working area for the image processing part (CPU/ASIC) 103 to perform image process, storing a processed image after the image process by the image processing part (CPU/ASIC) 103, and securing a working area used by the device controller (CPU/ASIC) 102.

The image forming part 105 includes a print engine (not shown) and prints the image stored in the memory 104 after the image process at the image processing part (CPU/ASIC) 103 by supplying a sheet from a single sheet supply part or one of multiple sheet supply parts (not shown).

The device information management part 106 acquires the status information from non-volatile memory 1013 during a normal mode, such as during image printing, and performs reading and writing upon a request by the device controller (CPU/ASIC) 102.

The power supply controller 107 centrally controls the power supply inside the printer 10. Specifically, the power supply controller 107 creates, according to the activity situation of the printer 10, two power supply states; a "normal mode" which supplies normal power to each part at the time of printing an image and the like, and a "power saving mode" which cuts off the power supply to the device controller (CPU/ASIC) 102, the image processing part (CPU/ASIC) 103, the memory 104, the image forming part 105, and the device information management part 106, and which supplies power only to the network controller 101 during a standby period and the like.

Figure 5:
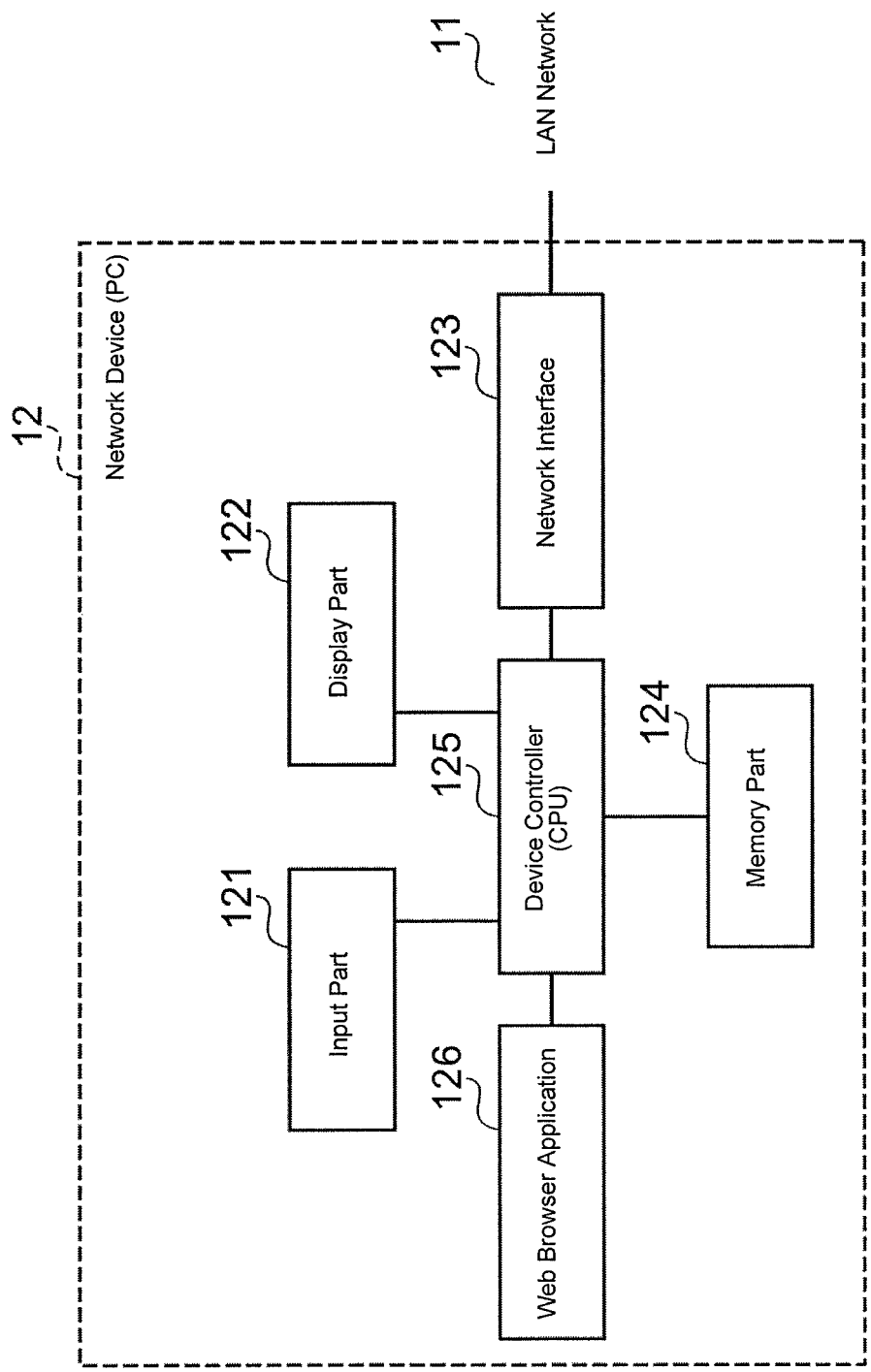
FIG. 5 is a schematic configuration diagram for explaining a configuration of the network device (PC).

Next, the configuration of the network devices (PC) 12a, 12b, and 12c of the present embodiment is explained with reference to FIG. 5. FIG. 5 is a schematic configuration diagram for explaining a configuration of the network device (PC) 12a, 12b and 12c. Here, the configuration of the respective network devices (PC) 12a, 12b, and 12c is the same, and the explanation below is given as the network device (PC) 12.

The network device (PC) 12 includes an input part 121, a display part 122, a network interface 123 as a receiving part and a sending part, a memory part 124, a device controller (CPU) 125, and a web browser application 126.

The input part 121 represents a keyboard, a mouse and the like as an input device provided in the network device (PC) 12. The input part 121 accepts the reference request and update request for the status information of the printer 10 while a web application object acquired from the printer 10 in the network device (PC) 12 is being executed.

The display part 122 represents a monitor and the like as a display device provided in the network device (PC) 12. The display part 122 displays the status information of the printer 10 while the web application object acquired from the printer 10 in the network device (PC) 12 is being executed.

The network interface 123 is a network interface for connecting the network device (PC) 12 to the LAN network 11. The network interface 123 acquires the web application object from the printer 10. The network interface 123 also acquires the status information of the printer 10 and requests updating of the status information when the web application object is being executed.

The memory part 124 is a memory provided as a memory device necessary for the operation of the network device (PC) 12. In the present embodiment, the memory part 124 stores a web application object acquired from the printer 10 and secures a working area accompanying the execution of the web application object. The status information acquired from the printer 10 by the web application object and the status information modified on the web application are included in the working area.

The device controller (CPU) 125 is a CPU that centrally controls the network device (PC) 12. For example, following the user's instructions accepted via the input part 121, the device controller (CPU) 125 causes the display part 122 to display images and the printer 10 to execute communication using the network interface 123.

The web browser application 126 is software running on the network device (PC) 12 for operating the web application object acquired from the printer 10 and includes runtime modules, such as Java (registered trademark) and Ajax, for operating the web application object.

Figure 6:
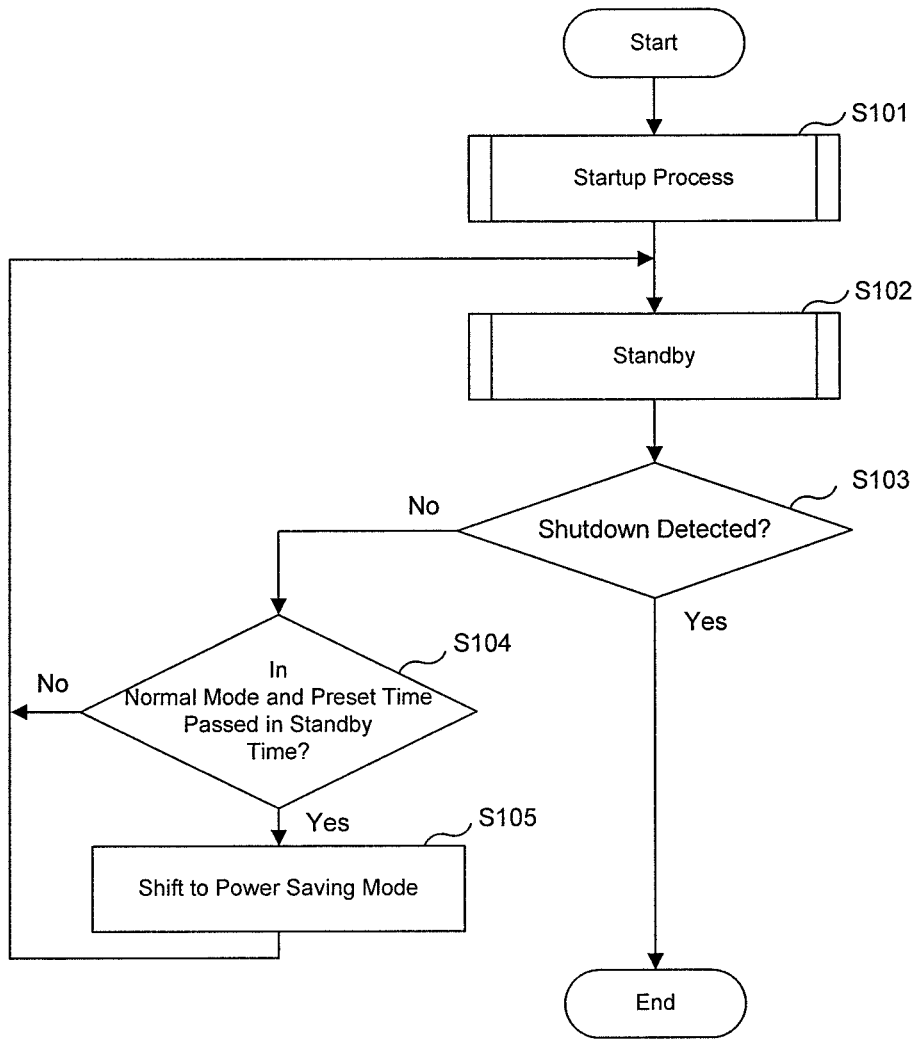
FIG. 6 is a flow diagram for explaining operation of the printer after turning on the power.

Next, operation of the printer 10 of the present embodiment is explained. FIG. 6 is a flow diagram for explaining operation of the printer 10 after turning on the power.

First, in S101, once the power of the printer 10 is turned on, the network controller 101, the device controller (CPU/ASIC) 102, and the image processing part (CPU/ASIC) 103 start up by reading the respective firmware and perform initialization processes by applying appropriate controls on the memory 104, the image forming part 105, the device information management part 106, and the power supply controller 107. In addition, the network controller part 1011 reads and starts up a web server program from the web server program storage part 1012. At the time, power supply controlled by the power supply controller 107 is in the normal mode.

Then, in S102, the network controller 101 detects an access from the network device (PC) 12. Here, if reception of a print job or a web access from the network device (PC) 12 is detected, the network controller 101 performs respectively appropriate process.

Next, the printer 10 detects whether or not a shutdown has been performed by the user. Here, the shutdown means a case where a power switch (not shown) on the printer 10 is turned off by the user, and if the power switch is turned off (Yes, S103), the power supply to the printer 10 is cut off, and all processes end. On the other hand, if the power switch is not turned off (No, S103), process by the printer 10 shifts to S104.

The device controller (CPU/ASIC) 102 judges whether or not the power supply controlled by the power supply controller 107 is in the normal mode, whether or not the "power saving" parameter in the "device management" in the device information management part 106 is "ON", and whether or not the standby time has passed by a preset "power saving time". Here, if the standby time has passed (Yes, S104), the power supply controlled by the power supply controller 107 is shifted to the power saving mode (S105). On the other hand, if the standby time has not passed (No, S104), process from S102 is repeated.

In S105 once the power supply is shifted to the power saving mode, the power supply controller 107 stops the power supply to the device controller (CPU/ASIC) 102, the image processing part (CPU/ASIC) 103, the memory 104, the image forming part 105, and the device information management part 106, other than the network controller 101.

Next, the startup process of the printer 10 in S101 in FIG. 6 is explained with reference to the flow diagram in FIG. 7.

In S1011, the network controller 101, the device controller (CPU/ASIC) 102, and the image processing part (CPU/ASIC) 103 start up by reading the respective firmware and perform initialization processes by applying appropriate controls on the memory 104, the image forming part 105, the device information management part 106, and the power supply controller 107. In addition, the network controller part (CPU/memory) 1011 reads and starts up a web server program from the web server program storage part 1012. At the time, power supply controlled by the power supply controller 107 is in the normal mode.

Then, the device controller (CPU/ASIC) 102 causes the status information stored in the non-volatile memory 1013 written to the device information management part 106 and reflected in subsequent device operations (S1012).

Figure 7:
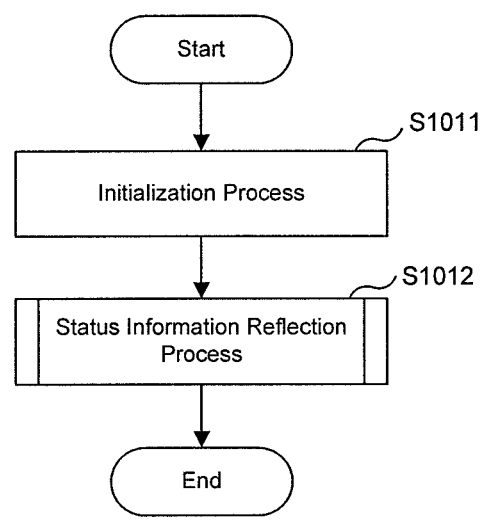
FIG. 7 is a flow diagram for explaining a startup process of the printer in FIG. 6.
Figure 8:
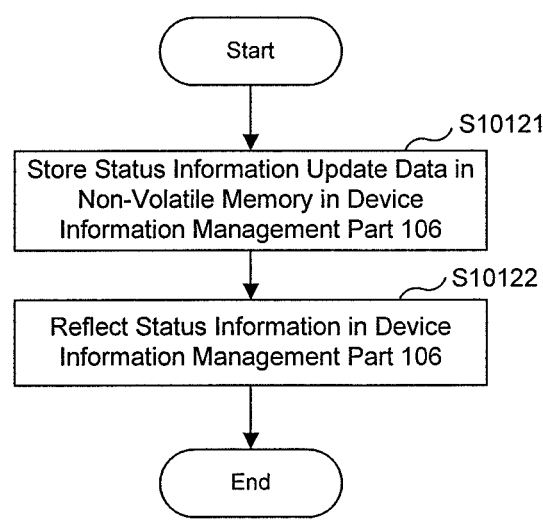
FIG. 8 is a flow diagram for explaining a status information reflection process in FIG. 7.

Furthermore, the status information reflection process in S1012 in FIG. 7 is explained with reference to the flow diagram in FIG. 8.

In S10121, the device controller (CPU/ASIC) 102 causes the status information update data stored in the non-volatile memory 1013 to be written to and stored in the device information management part 106.

Then, the device controller (CPU/ASIC) 102 causes the status information in the device information management part 106 reflected in subsequent device operations (S10122).

Figure 9:
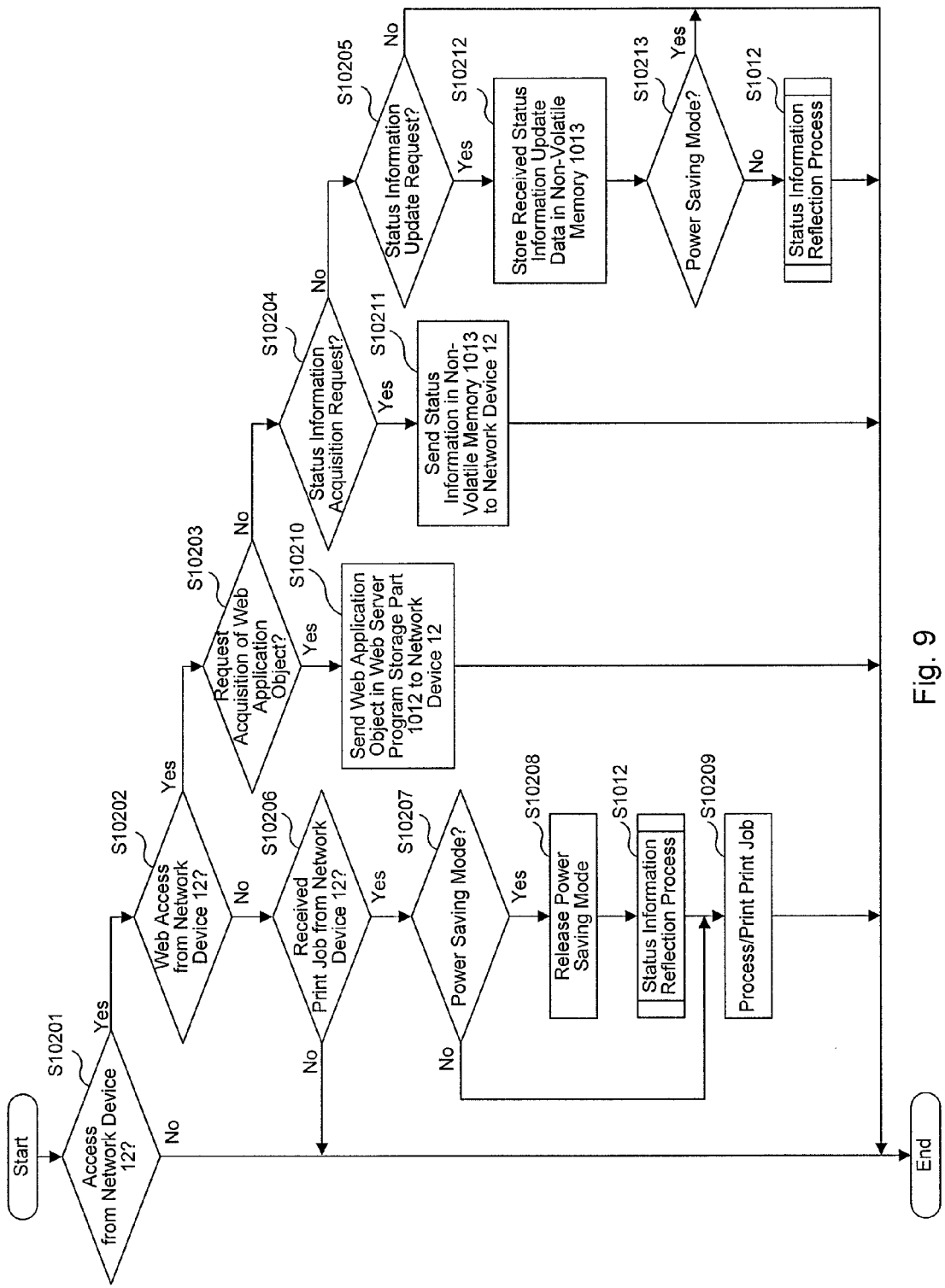
FIG. 9 is a flow diagram for explaining a printer standby state process in FIG. 6.

Next, the standby process of the printer 10 in S102 in FIG. 6 is explained with reference to the flow diagram in FIG. 9.

First, the network controller part (CPU/memory) 1011 judges whether or not there has been an access from the network device (PC) 12. If there has been an access from the network device (PC) 12 (Yes, S10201), the process by the network controller part (CPU/memory) 1011 shifts to S10202. On the other hand, if there has been no access from the network device (PC) 12 (No, S10201), the process by the network controller part (CPU/memory) 1011 ends.

In S10202, the network controller part (CPU/memory) 1011 judges whether or not the access from the network device (PC) 12 is a web access. If the access from the network device (PC) 12 is a web access (Yes, S10202), the process by the network controller part (CPU/memory) 1011 shifts to S10203. On the other hand, if the access by the network device (PC) 12 is not a web access (No, S10202), the process by the network controller part (CPU/memory) 1011 shifts to S10206.

In S10203, the network controller part (CPU/memory) 1011 judges whether or not the web address in the web access from the network device (PC) 12 satisfies a specified condition, using the web server program running in the network controller part 1011. For example, if an Internet protocol (IP) address assigned to the printer 10 is 192.168.1.12, the network controller part (CPU/memory) 1011 judges that the specified condition is satisfied when the web address is "http://192.168.1.12/". If it is judged that this condition is satisfied and that the network device (PC) 12 is requesting the acquisition of a web application object (Yes, S10203), the process by the network controller part (CPU/memory) 1011 shifts to S10210. On the other hand, if it is judged that the specified condition is not satisfied and that the network device (PC) 12 is not requesting the acquisition of a web application object (No, S10203), the process by the network controller part (CPU/memory) 1011 shifts to S10204.

If it is judged that the network device (PC) 12 is not requesting the acquisition of a web application object (No, S10203), the network controller part (CPU/memory) 1011 judges whether or not the content of the access from the network device (PC) 12 is to request the acquisition of the status information, using the web server program running in the network controller part (CPU/memory) 1011. If the content of the access from the network device (PC) 12 is a status information acquisition request (Yes, S10204), process by the network controller part (CPU/memory) 1011 shifts to S10211. On the other hand, if the content of the access from the network device (PC) 12 is not a status information acquisition request (No, S10204), the process by the network controller part (CPU/memory) 1011 shifts to S10205.

In S10205, the network controller part (CPU/memory) 1011 judges whether the content of the access from the network device (PC) 12 was to make an update request of status information by the web server program running in the network controller part (CPU/memory) 1011. If the content of the access from the network device (PC) 12 is a status information update request (Yes, S10205), process by the network controller part (CPU/memory) 1011 shifts to S10212.

On the other hand, if the content of the access from the network device (PC) 12 is not a status information update request (No, S10205), process by the network controller part (CPU/memory) 1011 ends.

If the access from the network device (PC) 12 is not a web access (No, S10202), the network controller part (CPU/memory) 1101 judges whether or not the content of the access from the network device (PC) 12 is a print job by the LPR protocol and the like. If the content of the access from the network device (PC) 12 is a print job by the LPR protocol and the like, that is, if the print job is received from the network device (PC) 12 (Yes, S10206), the process by the network controller part (CPU/memory) 1011 shifts to S10207. On the other hand, if the content of the access by the network device (PC) 12 is not a print job by the LPR protocol and the like (No, S10206), the process by the network controller part (CPU/memory) 1011 ends.

If the content of the access from the network device (PC) 12 is a print job by the LPR protocol and the like (Yes, S10206), the network controller part (CPU/memory) 1011 judges whether or not the power supply controlled by the power supply controller 107 is in the power saving mode. If power supply controlled by the power supply controller 107 is in the power saving mode (Yes, S10207), the network controller part (CPU/memory) 1011 shifts the power supply controlled by the power supply controller 107 from the power saving mode to the normal mode, that is, the power saving mode is released (S10208). In other words, the power supply controller 107 resumes the power supply to the device controller (CPU/ASIC) 102, the image processing part (CPU/ASIC) 103, the memory 104, the image forming part 105, and the device information management part 106, to which power supply had been stopped. On the other hand, if power supply controlled by the power supply controller 107 is not in the power saving mode (No, S10207), the process by the network controller part (CPU/memory) 1011 shifts to S10209.

In S10208, if the power supply controlled by the power supply controller 107 is shifted to the normal mode, the network controller part (CPU/memory) 1011 causes the received status information update data to be stored in the non-volatile memory 1013 in the status information reflection process (S1012).

In S10209, the device controller (CPU/ASIC) 102, the image processing part (CPU/ASIC) 103, the memory 104 and the image forming part 105 perform appropriate image processes for printing, such as color matching and dithering, to the received print job, and perform printing by supplying a sheet from a single sheet supply part or one of multiple of the sheet supply parts (not shown).

If it is judged that the network device (PC) 12 is requesting the acquisition of a web application object (Yes, S10203), the network controller part (CPU/memory) 1011 sends the web application object stored in the web server program storage part 1012 to the network device (PC) 12, using the web server program running in the network controller part (CPU/memory) 1011 (S10210).

In addition, if the content of the access from the network device (PC) 12 is a status information acquisition request (Yes, S10204), the network controller part (CPU/memory) 1011 sends the status information in the non-volatile memory 1013 and the status information update data that has not been reflected in devices, to the network device (PC) 12 using the web server program running in the network controller part (CPU/memory) 1011 (S10211).

In addition, if the content of the access from the network device (PC) 12 is a status information update request (Yes, S10205), the network controller part (CPU/memory) 1011 causes the received status information update data to be stored in the non-volatile memory 1013 (S10212).

Next, in S10213, the network controller part (CPU/memory) 1011 judges whether or not the power supply controlled by the power supply controller 107 is in the power saving mode. Here, if power supply controlled by the power supply controller 107 is in the power saving mode (Yes, S10213), the process by the network controller part (CPU/memory) 1011 ends. On the other hand, if power supply controlled by the power supply controller 107 is not in the power saving mode (No, S10213), the network controller part (CPU/memory) 1011 executes the status information reflection process of S1012.

Next, operation of the web application object running on the network device (PC) 12 of the present embodiment is explained with reference to the flow diagram in FIG. 10.

First, in S110, the web application object secures, as areas for storing status information, two variable groups of status information A and status information B in the memory part 124. That is, memory areas for storing the status information is acquired.

Next, the web application object instructs the network interface 123 to send to the printer 10 a request to acquire status information and the status information update data that has not been reflected in the devices (S111).

Then, the web application object decodes the results of requesting the acquisition of the status information and the status information update data that has not been reflected in the devices as requested in S111, in a format that can be handled by the web application object. The web application object then causes the information and data to be stored in the variable groups status information A and status information B secured in the memory part 124 (S112). Here, the status information B is a copy of the status information A.

Next, in S113, the web application object causes the display part 122 to display the operation screen via the web browser application 126 and makes reference and update of the status information in accordance of the operation of the input part 121 by the user. That is, the web application object displays a web screen and operates based on the operation by the user.

Here, an example of the operation screen displayed on the display part 122 via the web browser application 126 by the web application object is explained with reference to FIG. 11.

Figure 11:
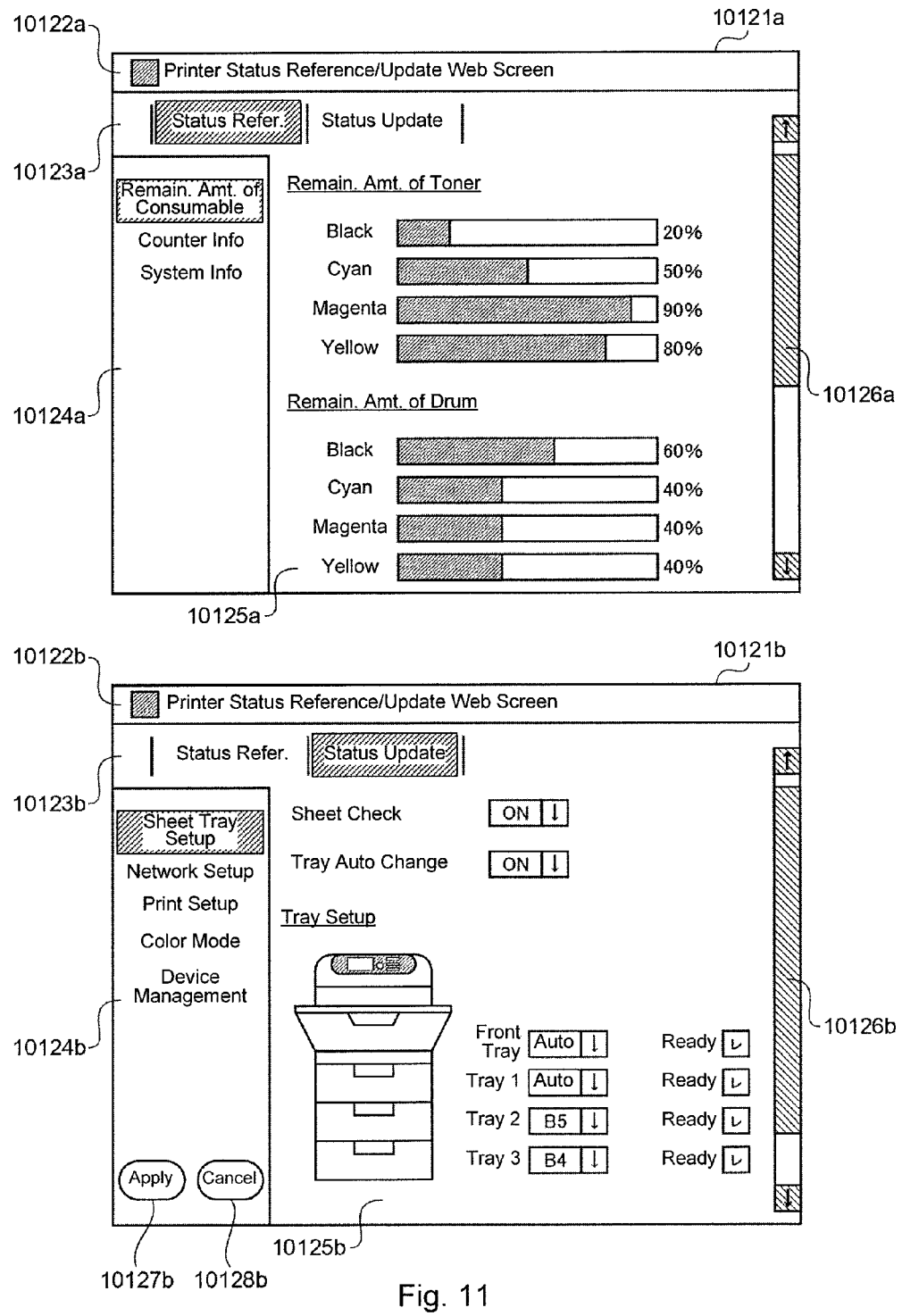
FIG. 11 is a schematic diagram explaining an example of a control screen.

As shown in FIG. 11, a screen 10121a is an example of a screen displayed at the time of when the web application object is executed to refer to status information. The screen 10121a is configured from four panes explained below.

A pane 10122a is a screen title and is a pane to show the user that the screen is the status information reference/update screen of the printer 10.

A pane 10123a is a pane to show that the current screen mode is either a "Status Reference" or a "Status Update". Either the "Status Reference" or the "Status Update" can be selected via the input part 121, and the selected one is highlighted. In the example shown in FIG. 11, "Status Reference" has been selected.

A pane 10124a shows the large classification of the status information based on the device-specific information 1061a. If one item among the large classification 1062a is selected via the input part 121, the selected item is highlighted. In the example shown in FIG. 11, "Remaining Amount of Consumable" has been selected.

A pane 10125a shows the medium classification 1063a and the small classification 1064a corresponding to the large classification 1062a selected in the pane 10124a via the input part 121, and parameters 1065a corresponding to the classifications are read out from the variable group status information A in the memory part 124 and displayed. In the example shown in FIG. 11, the parameters 1065a are graphically displayed with graphs and illustrations.

A scroll bar 10126a is a scroll bar displayed when the information displayed in the pane 10125a has become large and difficult to display all at once.

A screen 10121b is an example of a screen displayed when a web application object is being executed and when the status information is being updated. The screen 10121b is configured from four panes explained below.

A pane 10122b is a screen title and is a pane to show the user that the screen is the status information reference/update screen of the printer 10.

A pane 10123b is a pane to show that the current screen mode is either a "Status Reference" or a "Status Update". Either the "Status Reference" or the "Status Update" can be selected via the input part 121, and the selected one is highlighted. In the example shown in FIG. 11, "Status Update" has been selected.

A pane 10124a shows the large classification 1062b for the status information based on the modifiable information 1061b. If one item among the large classification 1062b is selected via the input part 121, the selected item is highlighted. Here, in the example shown in FIG. 11, "Sheet Tray Setup" has been selected.

A pane 10125b shows the medium classification 1063b and the small classification 1064b corresponding to the large classification 1062b selected in the pane 10124b via the input part 121, and parameters 1065b corresponding to the classifications are read out from the variable group status information A in the memory part 124 and displayed using checkboxes, pull-down menus, radio buttons, and the like. The parameters 1065b are modifiable by the user. The status update information modified in the pane 10125b is not instantly sent to the printer 10, but the variable group status information A in the memory part 124 is updated.

A scroll bar 10126b is a scroll bar displayed when the information displayed in the pane 10125b has become large and difficult to display all at once.

Figure 10:
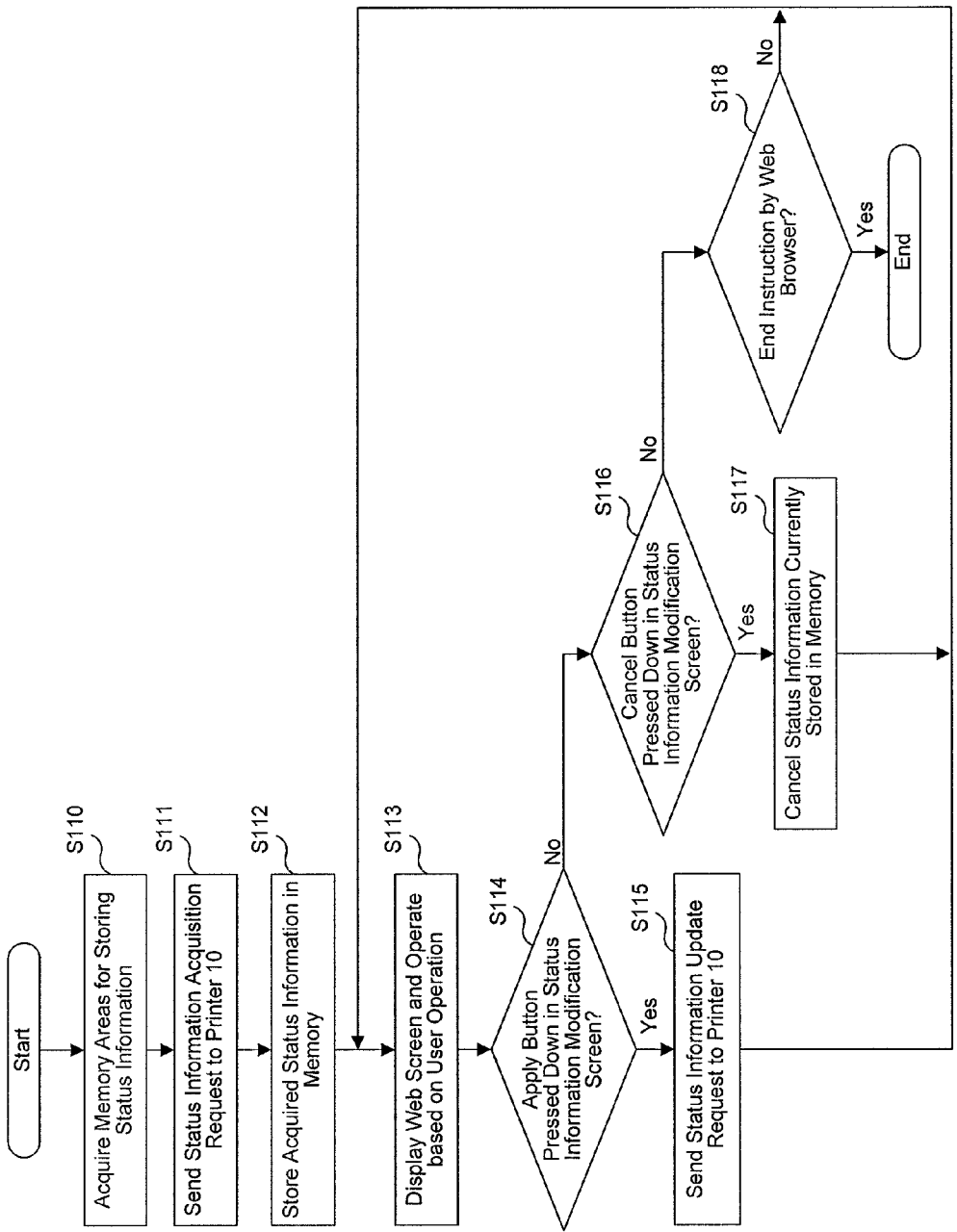
FIG. 10 is a flow diagram explaining operation of a web application object that drives the network device.

In S114 shown in FIG. 10, the web application object judges whether or not an Apply button 10127b on the operation screen displayed via the display part 122 is pressed down. If the Apply button 10127b is pressed down (Yes, S114), the process by the web application object shifts to S115. On the other hand, if the Apply button 10127b is not pressed down (No, S114), the process by the web application object shifts to S116.

If the Apply button 10127b is pressed down (Yes, S114), the web application object encodes the status information stored in the variable group status information in the memory part 124 in a fixed format which can be used by the device controller (CPU) 125 for storing the status information in the non-volatile memory 1013 in the printer 10 and has the status information sent to the printer 10 via the network interface 123.

If the Apply button 10127b is not pressed down (No, S114), the web application object judges whether or not a Cancel button 10128b on the operation screen displayed via the display part 122 is pressed down. If the Cancel button 10128b is pressed down (Yes, S116), process by the web application object shifts to S117. On the other hand, if the Cancel button 10128b is not pressed down (No, S116), the process by the web application object shifts to S118.

If the Cancel button 10128b is pressed down (Yes, S116), the web application object resets the status update information modified via the input part 121 in the pane 10125b to restore the original state before the modification (pre-modification state). That is, the status information currently stored in the memory is canceled. (S117). In other words, the web application object copies the content of the variable group status information B in the memory part 124 to the variable group status information A. Once the status information of the memory part 124 is reset to the pre-modification state, the display of the pane 10125b is also rewritten to the state before the modification.

On the other hand, if the Cancel button 10128b is not pressed down (No, S116), the web application object detects an end signal due to closing a web browser, moving to another web page, and the like. If the end signal due to closing a web browser, moving to another web page, and the like is detected, that is, if there is an end instruction to end by the web browser (Yes, S118), the web application object ends the process. If the end signal is not detected (No, S118), the process by the web application object shifts to S113.

As described above, according to the first embodiment, a non-volatile memory in which printer status information is recorded is provided in a network controller that operates even under a power saving mode to respond to the reference request and update request for the status information from network device. In addition, when the network controller receives a status information update request under the power saving mode, the status information is reflected when the process is shifted to a normal mode. Therefore, the power supply to a device controller and an image processing part with large power consumption can be cut off in the power saving mode, enabling power consumption to be effectively reduced.

Second Embodiment

Similar to the first embodiment, the second embodiment is explained using an image forming system as an example, which is constructed by connecting a printer as an image forming apparatus to a LAN network including multiple units of network devices as external devices.

In explaining the present embodiment, parts that are the same as those in the first embodiment are identified by the same symbols, and explanation is omitted.

Figure 12:
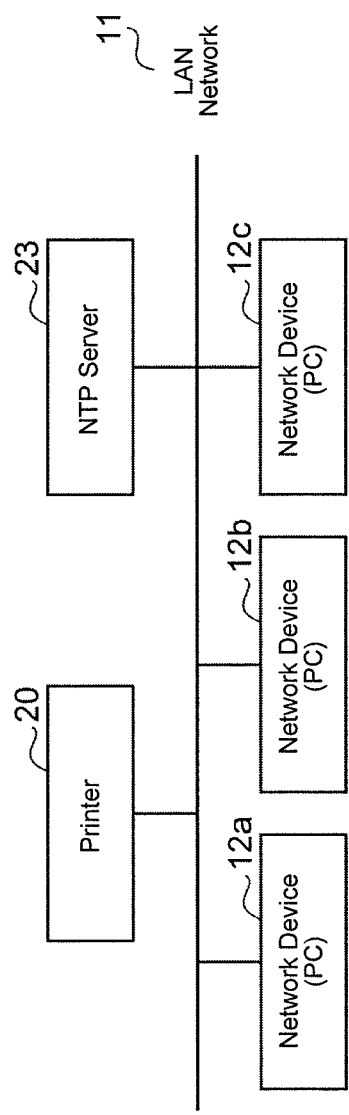
FIG. 12 is a diagram explaining an example of the connection between the printer and the network device via the LAN network.

FIG. 12 is a diagram explaining an example of the connection between a printer 20, the network device (PC) 12a, 12b and 12c and a network time protocol (NTP) server 23 via the LAN network 11.

Here, the network devices (PCs) 12a, 12b, and 12c are external devices connected via the LAN network 11. In the present embodiment, the network devices (PCs) 12a, 12b, and 12c are assumed to be personal computers (PCs) that include at least a web browser. However, other forms of devices that include a web browser may be used.

The NTP server 23 performs the synchronization of time information of the printer 20 and the network devices (PC) 12a, 12b, and 12c inside the LAN network 11.

Figure 13:
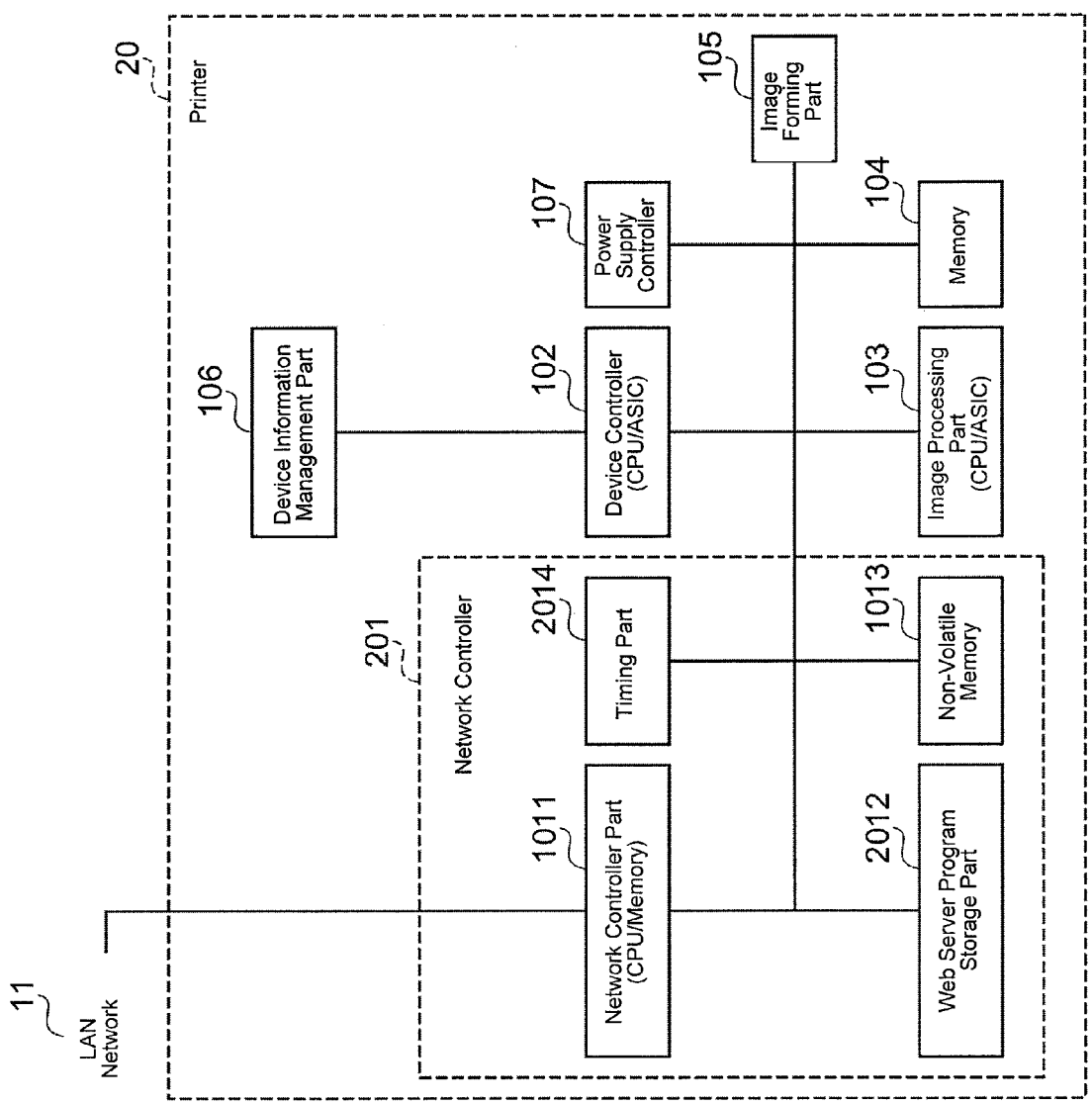
FIG. 13 is a schematic configuration diagram for explaining the configuration of the printer.

Next, a configuration of the printer 20 is explained with reference to FIG. 13. FIG. 13 is a schematic configuration diagram for explaining a configuration of the printer 20.

The printer 20 includes a network controller 201, a device controller (CPU/ASIC) 102, an image processing part (CPU/ASIC) 103, a memory 104, an image forming part 105, a device information management part 106, and a power supply controller 107.

The network controller 201 includes a web server program storage part 2012 and a timing part 2014 in addition to the function of the network controller 101 of the first embodiment, and checks whether the status information retained by the network devices (PC) 12a, 12b, and 12c is older than the status information in the printer 20.

The timing part 2014 provides a function to measure the passage of time and supplies time information to the network controller part 1011. Ideally, time information in the timing part 2014 is synchronized with the accurate present time by periodically accessing the NTP server 23.

The web server program storage part 2012 stores a web server program for responding to web accesses from the network devices (PC) 12a, 12b, and 12c on the LAN network 11 and web contents utilized by the web server program. The web server program is executed by a CPU inside the network controller part (CPU/memory) 1011. Specifically, the web server program is a simple program including the following four functions. First, the web server program includes a function to send a web application object to a specified web address upon a web access as a reference request of status information from the network devices (PC) 12a, 12b, and 12c. The web server program also includes a function to express time information acquired from the timing part 2014 in the 4-byte UNIX (registered trademark) time, to add the time information as status acquisition time to the end of the status information stored in non-volatile memory 1013, and to send the result to the network devices (PC) 12a, 12b, and 12c, when there is a status information acquisition request from the network devices (PC) 12a, 12b, and 12c. In addition, the web server program includes a function to write the received status information into the non-volatile memory 1013, to cause the time information acquired from the timing part 2014 to be memorized and stored in the memory in the network controller part (CPU/memory) 1011 as the status update time, when there is the status information update request from the network devices (PC) 12a, 12b, and 12c. Furthermore, the web server program includes a function to judge whether or not the status information retained by the network devices (PC) 12a, 12b, and 12c is older than the status information of the printer 20, and if older, to send the status information in the printer 20 to the network devices (PC) 12a, 12b, and 12c, when there is a status check request from the network devices (PC) 12a, 12b, and 12c.

Whether or not the status information retained by the network devices (PC) 12a, 12b, and 12c is older than the status information of the printer 20 is judged by the method shown below.

In other words, the previous status acquisition information is included in the status check request information from the network devices (PC) 12a, 12b, and 12c, and if the previous status acquisition information is older than the status update time stored in the memory in the network controller part (CPU/memory) 1011, the web server program judges that the status information retained by the network devices (PC) 12*a*, 12*b*, and 12*c* is old.

The web application object stored in the web server program storage part 2012 is different from the web application object of the first embodiment in the following aspects. First, in receiving the status information of the printer 20, the web application object receives and stores the status acquisition time expressed in the 4-byte UNIX (registered trademark) time. In addition, after acquiring the status information, the web application object periodically makes a status check request to the printer 20. At this time, the web application object adds the previous status acquisition time in the web application object expressed in the 4-byte UNIX (registered trademark) time in sending the request. If the response from the printer 20 contains status information which is different from the status information previously acquired by the web application object, the web application object updates the status information and the status acquisition time in the web application object. In the present embodiment, the inquiry is assumed to be executed every five minutes.

Next, operation of the printer 20 of the present embodiment is explained.

Figure 14:
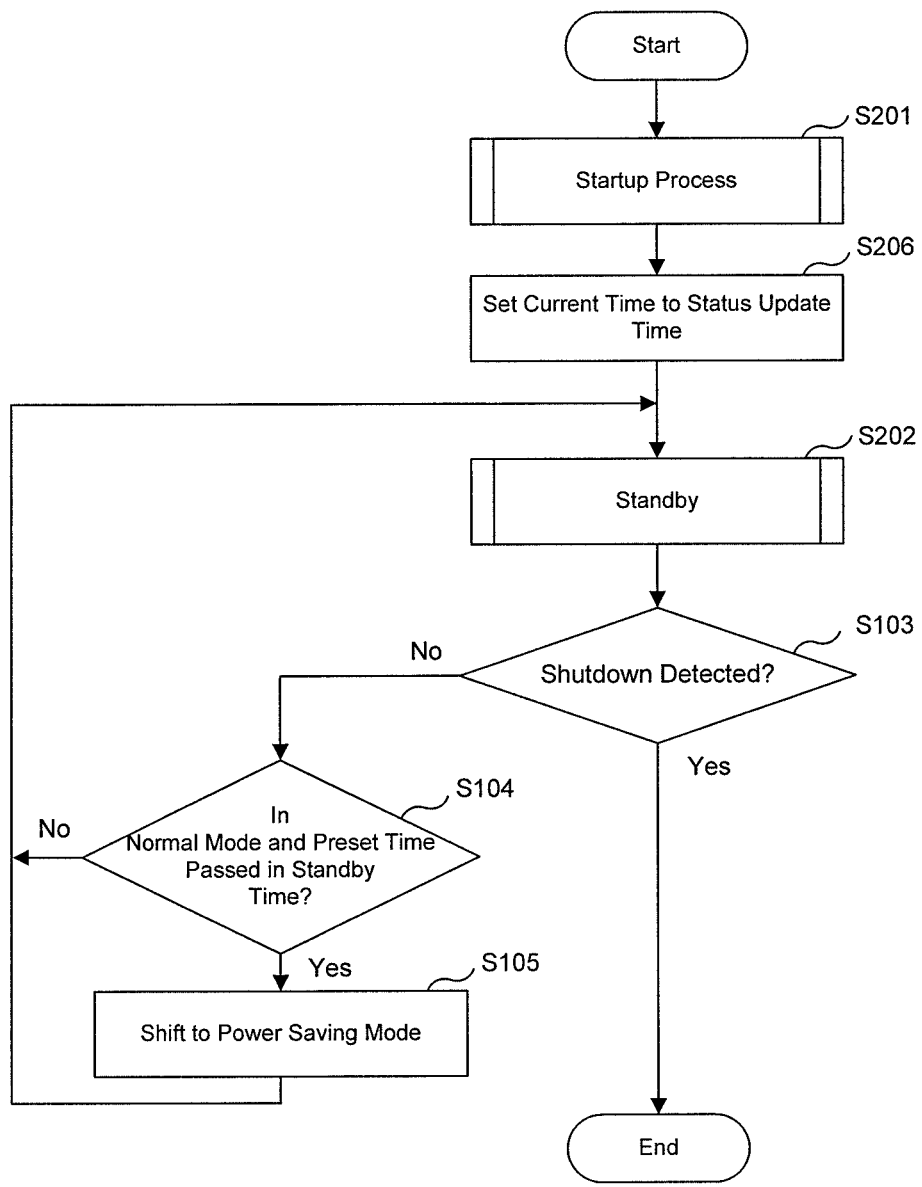
FIG. 14 is a flow diagram for explaining operation of the printer after turning on the power.

FIG. 14 is a flow diagram for explaining operation of the printer 20 after turning on the power. In this following explanation, the network devices (PC) 12*a*, 12*b*, and 12*c* are explained as network devices (PC) 12.

First, in S201, once the power of the printer 20 is turned on, the network controller 201, the device controller (CPU/ASIC) 102, and the image processing part (CPU/ASIC) 103 start up by reading their respective firmware and perform initialization process by applying appropriate controls on the memory 104, the image forming part 105, the device information management part 106, and the power supply controller 107. In addition, the network controller part (CPU/memory) 1011 reads and starts up the web server program from the web server program storage part 2012. At this time, power supply controlled by the power supply controller 107 is in the normal mode.

Next, in S206, the network controller 201 acquires time information from the timing part 2014 and writes the acquired current time onto the status update time in the memory in the network controller part (CPU/memory) 1011.

Then, in S202, the network controller 201 detects an access from the network device (PC) 12. Here, if reception of a print job or a web access from the network device (PC) 12 is detected, the network controller 201 performs respectively appropriate process.

Next, the printer 20 detects whether or not a shutdown has been performed by the user. Here, the shutdown means a case where a power switch (not shown) on the printer 20 is turned off by the user, and if the power switch is turned off (Yes, S103), the power supply to the printer 20 is cut off, and all processes end. On the other hand, if the power switch is not turned off (No, S103), process by the printer 20 shifts to S104.

The device controller (CPU/ASIC) 102 judges whether or not the power supply controlled by the power supply controller 107 is in the normal mode, whether or not the "power saving" parameter in the "device management" in the device information management part 106 is "ON", and whether or not a preset "power saving time" has passed in the standby time. Here, if the standby time has passed (Yes, S104), the power supply controlled by the power supply controller 107 is shifted to the power saving mode (S105). On the other hand, if the standby time has not passed (No, S104), process from S202 is repeated.

In S105 once the power supply is shifted to the power saving mode, the power supply controller 107 stops the power supply to the device controller (CPU/ASIC) 102, the image processing part (CPU/ASIC) 103, the memory 104, the image forming part 105, and the device information management part 106, other than the network controller 201.

Figure 15:
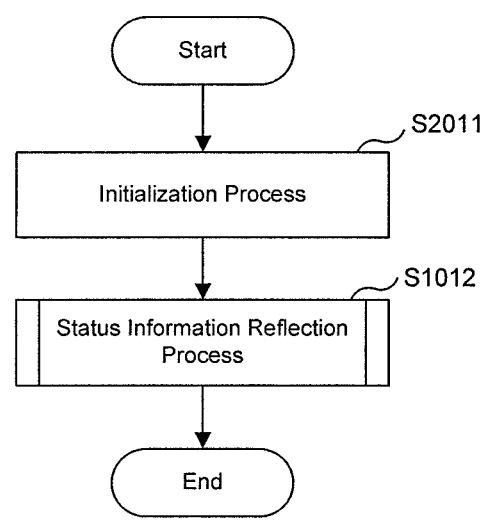
FIG. 15 is a flow diagram for explaining a startup process of the printer in FIG. 14.

Next, the startup process of the printer 20 in S201 in FIG. 14 is explained with reference to the flow diagram in FIG. 15.

In S2011 the network controller 201, the device controller (CPU/ASIC) 102, and the image processing part (CPU/ASIC) 103 start up by reading their respective firmware and perform initialization process by applying appropriate controls on the memory 104, the image forming part 105, the device information control management part 106, and the power supply controller 107. In addition, the network controller part (CPU/memory) 1011 reads and starts up the web server program from the web server program storage part 2012. At this time, power supply controlled by the power supply controller 107 is in the normal mode.

Then, the device controller (CPU/ASIC) 102 causes the status information stored in the non-volatile memory 1013 to be written to the device information management part 106 and reflected in future device operations (S1012).

Figure 16:
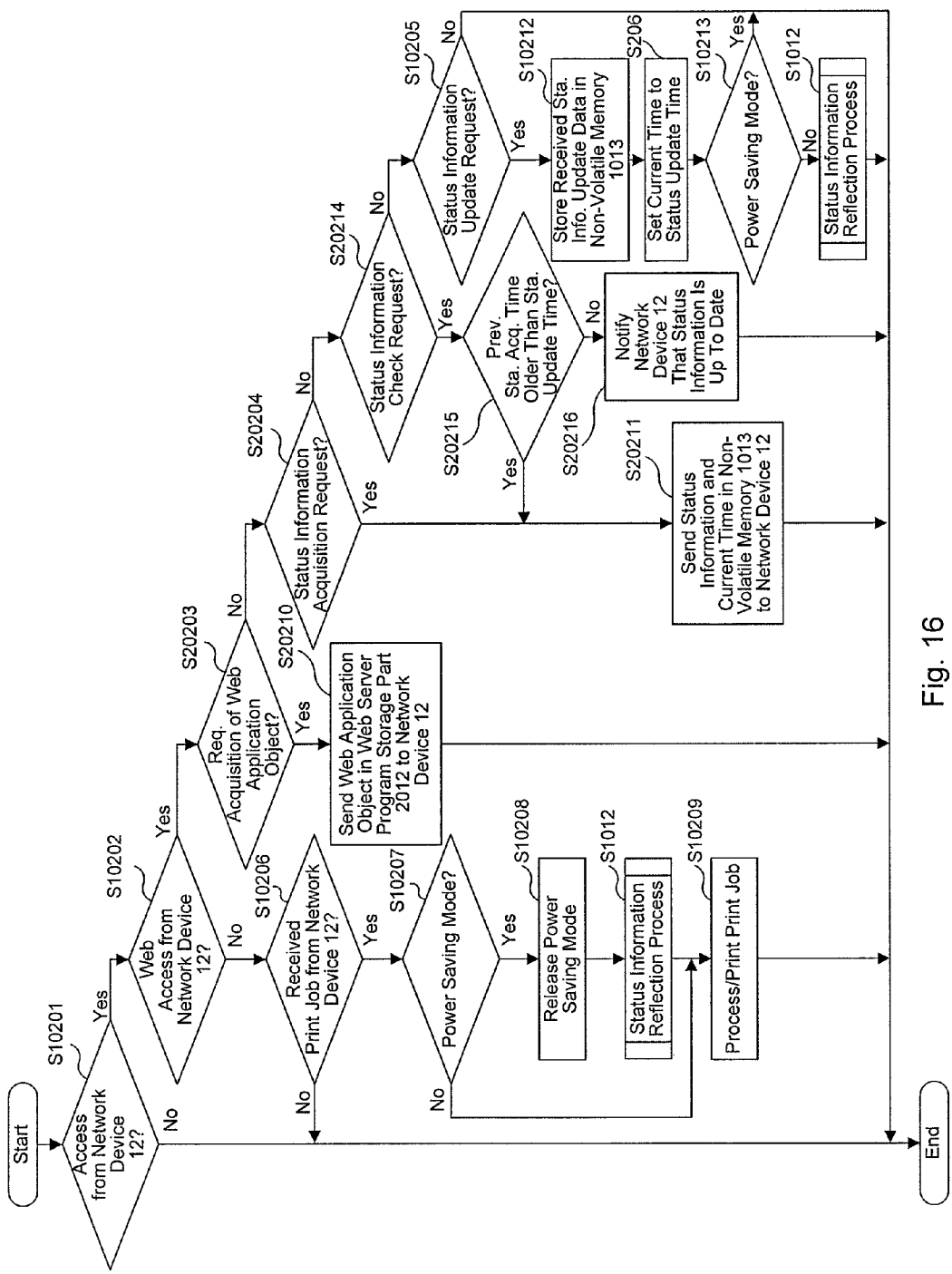
FIG. 16 is a flow diagram for explaining a standby state process of the printer in FIG. 14.

Next, the standby process of the printer 20 in S202 in FIG. 14 is explained with reference to the flow diagram in FIG. 16.

First, the network controller part (CPU/memory) 1011 judges whether or not there has been an access from the network device (PC) 12. If there has been an access from the network device (PC) 12 (Yes, S10201), the process by the network controller part (CPU/memory) 1011 shifts to S10202. On the other hand, if there has been no access from the network device (PC) 12 (No, S10201), the process by the network controller part (CPU/memory) 1011 ends.

In S10202, the network controller part (CPU/memory) 1011 judges whether or not the access from the network device (PC) 12 is a web access. If the access from the network device (PC) 12 is a web access (Yes, S10202), the process by the network controller part (CPU/memory) 1011 shifts to S20203. On the other hand, if the access by the network device (PC) 12 is not a web access (No, S10202), the process by the network controller part (CPU/memory) 1011 shifts to S10206.

In S20203 the network controller part (CPU/memory) 1011 judges whether or not the web address in the web access from the network device (PC) 12 satisfies a specified condition, using the web server program running in the network controller part (CPU/memory) 1011. For example, if an Internet protocol (IP) address assigned to the printer 10 is 192.168.1.12, the network controller part 1011 judges that the specified condition is satisfied when the web address is "http://192.168.1.12/". If it is judged that this condition is satisfied and that the network device (PC) 12 is requesting the acquisition of a web application object (Yes, S20203), the process by the network controller part (CPU/memory) 1011 shifts to S20210. On the other hand, if it is judged that the specified condition is not satisfied and that the network device (PC) 12 is not requesting the acquisition of a web application object (No, S20203), the process by the network controller part (CPU/memory) 1011 shifts to S20204.

If it is judged that the network device (PC) 12 is not requesting the acquisition of a web application object (No, S20203), the network controller part (CPU/memory) 1011 judges whether or not the content of the access from the network device (PC) 12 is to request the acquisition of the status information, using the web server program running in the network controller part (CPU/memory) 1011. If the content of the access from the network device (PC) 12 is a status information acquisition request (Yes, S20204), process by the network controller part (CPU/memory) 1011 shifts to S20211. On the other hand, if the content of the access from the network device (PC) 12 is not a status information acquisition request (No, S20204), the process by the network controller part (CPU/memory) 1011 shifts to S20214.

If the content of the access from the network device (PC) 12 was not a status information acquisition request (No, S20204), the network controller part (CPU/memory) 1011 judges whether or not the content of the access from the network device (PC) 12 is to request a status information check, using the web server program running in the network controller part (CPU/memory) 1011. If the content of the access from the network device (PC) 12 is a status information check request (Yes, S20214), the process by the network controller part (CPU/memory) 1011 shifts to S20215. On the other hand, if the content of the access from the network device (PC) 12 was not a status information check request (No, S20214), the process by the network controller part (CPU/memory) 1011 shifts to S10205.

If the content of the access from the network device (PC) 12 is a status information check request (Yes, S20214), the network controller part (CPU/memory) 1011 reads out the previous status acquisition time included in the received data whose status information check is requested from the network device (PC) 12 and judges whether or not the acquisition time is older than the status update time stored in the memory in the network controller part (CPU/memory) 1011. If the acquisition time is older than the status update time stored in the memory in the network controller part (CPU/memory) 1011 (Yes, S20215), the process by the network controller part (CPU/memory) 1011 shifts to S20211. On the other hand, if the acquisition time is not older than the status update time stored in the memory in the network controller part (CPU/memory) 1011 (No, S20215), the process by the network controller part (CPU/memory) 1011 shifts to S20216.

In S20216, the network controller part (CPU/memory) 1011 notifies the network device (PC) 12 that the status information is up to date by the web server program running in the network controller part (CPU/memory) 1011.

In S10205, the network controller part (CPU/memory) 1011 judges whether the content of the access from the network device (PC) 12 was to make an update request of status information by the web server program running in the network controller part (CPU/memory) 1011. If the content of the access from the network device (PC) 12 is a status information update request (Yes, S10205), process by the network controller part (CPU/memory) 1011 shifts to S10212. On the other hand, if the content of the access from the network device (PC) 12 is not a status information update request (No, S10205), process by the network controller part (CPU/memory) 1011 ends.

If the access from the network device (PC) 12 is not a web access (No, S10202), the network controller part (CPU/memory) 1101 judges whether or not the content of the access from the network device (PC) 12 is a print job by the LPR protocol and the like. If the content of the access from the network device (PC) 12 is a print job by the LPR protocol and the like (Yes, S10206), the process by the network controller part (CPU/memory) 1011 shifts to S10207. On the other hand, if the content of the access by the network device (PC) 12 is not a print job by the LPR protocol and the like (No, S10206), the process by the network controller part (CPU/memory) 1011 ends.

If the content of the access from the network device (PC) 12 is a print job by the LPR protocol and the like (Yes, S10206), the network controller part (CPU/memory) 1011 judges whether or not the power supply controlled by the power supply controller 107 is in the power saving mode. If power supply controlled by the power supply controller 107 is in the power saving mode (Yes, S10207), the network controller part (CPU/memory) 1011 shifts the power supply controlled by the power supply controller 107 from the power saving mode to the normal mode (S10208). In other words, the power supply controller 107 resumes the power supply to the device controller (CPU/ASIC) 102, the image processing part (CPU/ASIC) 103, the memory 104, the image forming part 105, and the device information management part 106, to which power supply had been stopped. On the other hand, if power supply controlled by the power supply controller 107 is not in the power saving mode (No, S10207), the process by the network controller part 1011 shifts to S10209.

In S10208, if the power supply controlled by the power supply controller 107 is shifted to the normal mode, the network controller part (CPU/memory) 1011 causes the received status information update data to be stored in the non-volatile memory 1013 (S1012).

In S10209, the device controller (CPU/ASIC) 102, the image processing part (CPU/ASIC) 103, the memory 104 and the image forming part 105 perform appropriate image processes for printing, such as color matching and dithering, to the received print job, and perform printing by supplying a sheet from a single sheet supply part or one of multiple of the sheet supply parts (not shown).

If it is judged that the network device (PC) 12 is requesting the acquisition of a web application object (Yes, S20203), the network controller part (CPU/memory) 1011 sends the web application object stored in the web server program storage part 2012 to the network device (PC) 12, using the web server program running in the network controller part (CPU/memory) 1011 (S20210).

In addition, if the content of the access from the network device (PC) 12 is a status information acquisition request (Yes, S20204), the network controller part (CPU/memory) 1011 adds time information of the timing part 2014 expressed in the 4-byte UNIX (registered trademark) time as status acquisition time to the end of the status information stored in the non-volatile memory 1013, and sends the results to the network device (PC) 12 (S20211), using the Web server program operating in the network controller part (CPU/memory) 1011.

In addition, if the content of the access from the network device (PC) 12 is a status information update request (Yes, S10205), the network controller part (CPU/memory) 1011 causes the received status information update data to be stored in the non-volatile memory 1013 (S10212).

Next, in S10213, the network controller part (CPU/memory) 1011 judges whether or not the power supply controlled by the power supply controller 107 is in the power saving mode. Here, if power supply controlled by the power supply controller 107 is in the power saving mode (Yes, S10213), the process by the network controller part (CPU/memory) 1011 ends. On the other hand, if power supply controlled by the power supply controller 107 is not in the power saving mode (No, S10213), the network controller part (CPU/memory) 1011 executes the status information reflection process of S1012.

Figure 17:
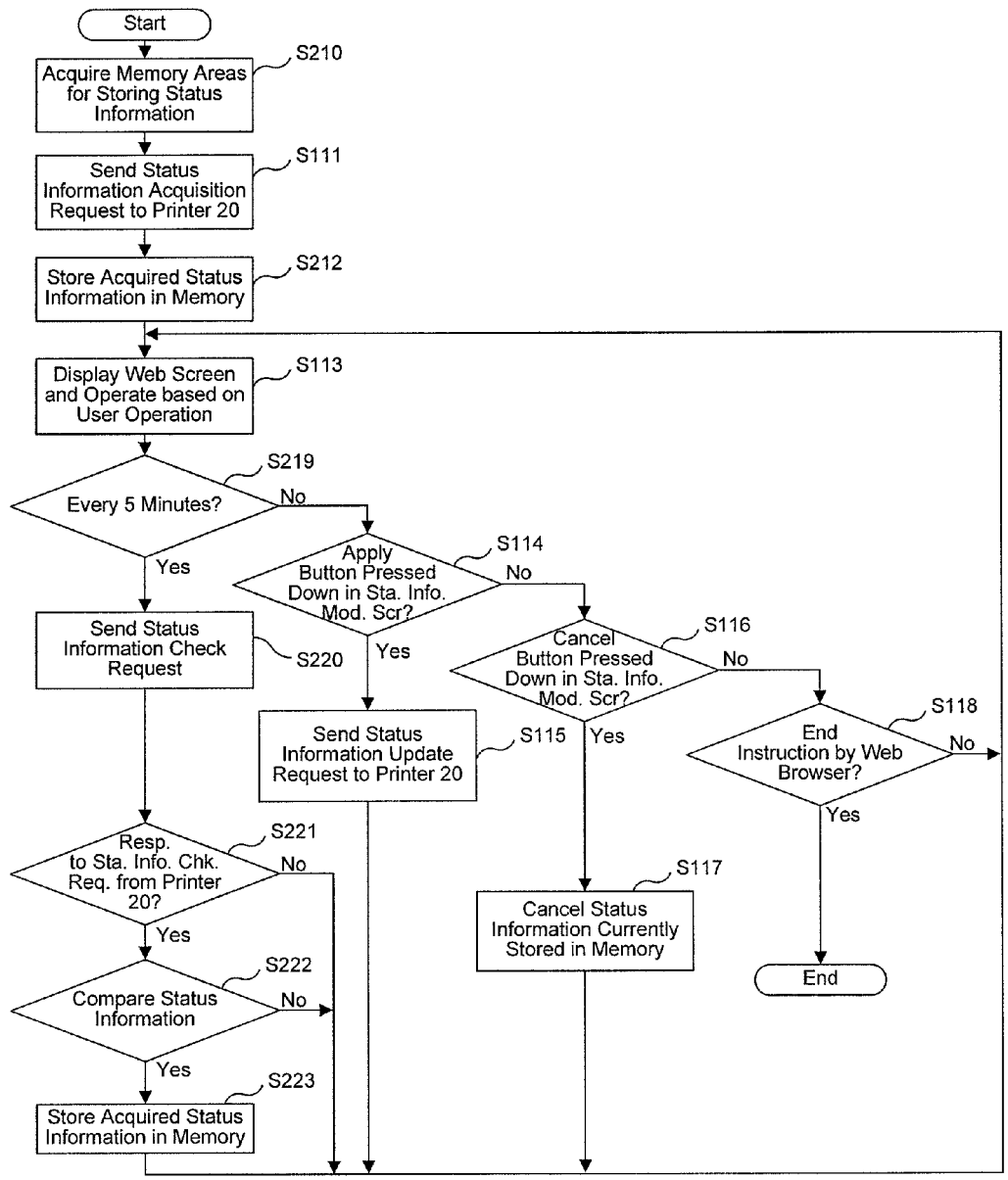
FIG. 17 is a flow diagram explaining operation of the web application object that drives the network device.

Next, operation of the web application object running on the network device (PC) 12 of the present embodiment is explained with reference to the flow diagram in FIG. 17.

First, in S210, the web application object secures, as areas for storing stratus information, two variable groups of status information A and status information B and a 4-byte area for storing the previous status acquisition time in the UNIX (registered trademark) time in the memory part 124.

Next, the web application object instructs the network interface 123 to send to the printer 20 a request to acquire status information and the status information update data that has not been reflected in the devices (S111).

Then, the web application object decodes the results of requesting the acquisition of the status information and the status information update data that has not been reflected in the device as requested in S111, in a format that can be handled by the web application object. The web application object then causes the information and data to be stored in the variable group status information A, status information B, and the previous status acquisition time secured in the memory part 124. Here, the status information B is a copy of the status information A. In addition, in the status acquisition time, the time information is stored in the 4-byte UNIX (registered trademark) time format.

Next, in S113, the web application object causes the display part 122 to display the operation screen via the web browser application 126 and makes reference and update of the status information in accordance of the operation of the input part 121 by the user.

Next, in S219, the web application object checks a trigger of a timer program embedded in itself that performs an interrupt every five minutes. If the trigger is up (Yes, S219), the process by the web application object shifts to S220. On the other hand, if the trigger is not up (No, S219), the process by the web application object shifts to S114.

If the trigger of the timer program is up (Yes, S219), the web application object instructs the network interface 123 to send a status information check request to the printer 20 (S220).

Then, in S221, the web application object receives a response to the status information check request sent in S220 and checks whether or not status information is contained in the response. If the status information is included (Yes, S221), the process by the web application object shifts to S222. On the other hand, if the status information is not included in the response (No, S221), the process by the web application object shifts to S113.

If the status information is included in the response (Yes, S221), the web application object decodes the results of acquiring the status information acquired in S220, in a format that can be handled by the web application object and compares the results with the variable group status information B in the memory part 124. Here, if there is a difference in the results of comparison (Yes, S222), the process by the web application object shifts to S223. On the other hand, if there is no difference in the results of comparison (No, S222), the process by the web application object shifts to S113.

Then, the web application object decodes the result of acquiring status information in S220 in a format that can be handled by the web application object and causes the information to be stored in the variable group status information A, status information B, and the previous status acquisition time in the memory part 124. Here, the status information B is a copy of the status information A. In addition, the status acquisition time causes the time information to be stored in the 4-byte UNIX (registered trademark) time format.

Figure 18:
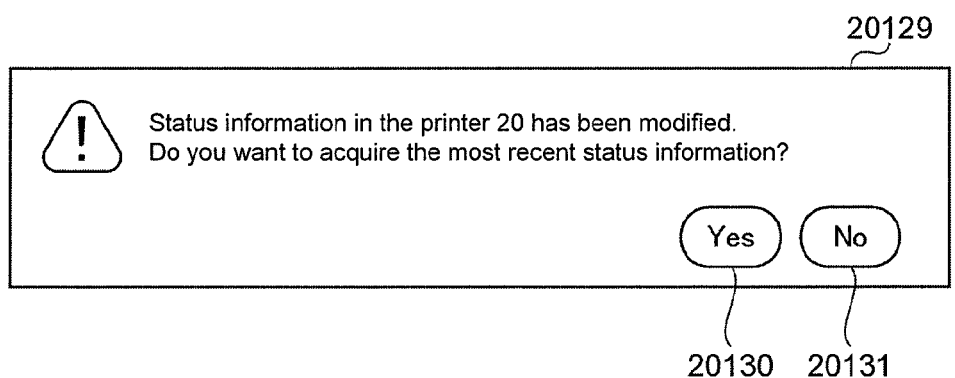
FIG. 18 is a schematic diagram explaining an example of the control screen.

Here, the user may be asked for the operation in S223. For example, a screen, such as a window 20129 shown in FIG. 18, may be displayed on the display part 122, and the user may be asked for his judgment regarding the modification. In this example, if a Yes button 20130 is pressed down by the user, the process in S223 is executed, and if a No button 20131 is pressed down, the process of S113 is executed.

In S114, the web application object judges whether or not an Apply button 10127*b* on the operation screen displayed via the display part 122 is pressed down. If the Apply button 10127*b* is pressed down (Yes, S114), the process by the web application object shifts to S115. On the other hand, if the Apply button 10127*b* is not pressed down (No, S114), the process by the web application object shifts to S116.

If the Apply button 10127*b* is pressed down (Yes, S114), the web application object encodes the status information stored in the variable group status information in the memory part 124 in a fixed format which can be used by the device controller (CPU) 125 for storing the status information in the non-volatile memory 1013 in the printer 20 and has the status information sent to the printer 20 via the network interface 123.

If the Apply button 10127*b* is not pressed down (No, S114), the web application object judges whether or not a Cancel button 10128*b* on the operation screen displayed via the display part 122 is pressed down. If the Cancel button 10128*b* is pressed down (Yes, S116), the process by the web application object shifts to S117. On the other hand, if the Cancel button 10128*b* is not pressed down (No, S116), the process by the web application object shifts to S116.

If the Cancel button 10128*b* is pressed down (Yes, S116), the web application object resets the status update information modified via the input part 121 in the pane 10125*b* to restore the original state before the modification (pre-modification state) (S117). In other words, the web application object copies the content of the variable group status information B in the memory part 124 to the variable group status information A. Once the status information of the memory part 124 is reset to the pre-modification state, the display of the pane 10125*b* is also rewritten to the state before the modification.

On the other hand, if the Cancel button 10128*b* is not pressed down (No, S116), the web application object detects an end signal due to closing a web browser, moving to another web page, and the like. If the end signal due to closing a web browser, moving to another web page, and the like is detected (Yes, S118), the web application object ends the process. If the end signal is not detected (No, S118), the process by the web application object shifts to S113.

As described above, according to the second embodiment, when the network controller receives a status check request, if it is judged that the status information retained by the network device that sends the status check request is older than the status information retained by the network controller, the status information retained on the network device is advantageously updated to the most recent status information by responding with the status information retained by the network controller, in addition to the advantage of the first embodiment.

Although, in the present embodiment, a printer is explained as an example of image forming apparatus, the present application is not limited to this but is applicable to other devices such as multi function peripherals (MFPs) including scanner, FAX functions and the like, where the status information in the device is at least referred to or updated externally by a network controller.

In addition, although in explaining the present embodiment, a web application on a web browser is used as a tool for referring to and updating the status information of an image forming apparatus, in the present application anything that can perform communication between the network device and the image forming apparatus while having a dialogue with the user may be adopted, and a form that utilizes a client application pre-embedded in the network device may be adopted.

Here, drawings used for explaining the present embodiment and URL, proprietary status information, and the like included in the text do not limit the present application.

What is claimed is:

1. An image forming apparatus that is configured using status information, comprising:
   a communication part that includes a memory part that stores the status information of the image forming apparatus, and a server part that performs communication with, and receives image data and a status information update request from an external device, the status information update request including status information update data for the status information;
   an image processing part that processes the image data that is received by the communication part;
   an image forming part that forms an image of the image data processed by the image processing part; and
   a power supply controller that controls power supplied to the communication part, the image processing part and the image forming part during a normal mode, wherein
   the power supply controller terminates the power supplied to the image processing part and the image forming part, and supplies the power to only the communication part during a power saving mode,
   when the server part receives the status information update request from the external device during the power saving mode, the status information update data of the received status information update request is stored in the memory part, and
   when the power saving mode is shifted to the normal mode, the communication part modifies the status information stored in the memory part using the status information update data stored in the memory part and configures the image forming apparatus using the modified status information in which the status information update data has been reflected.

2. The image forming apparatus according to claim 1, wherein
   the memory part stores a client application object to be sent to the external device, and
   the communication part is configured to accept a first reference request, which is a request to send the client application object, and a second reference request, which is a request to send the status information.

3. The image forming apparatus according to claim 2, wherein
   the communication part sends, upon acceptance of the second reference request, the status information and the status information update request that has not been reflected in the status information.

4. The image forming apparatus according to claim 3, further comprising:
   a device controller that controls the communication part, the image processing part, the image forming part and the power supply controller, wherein
   the device controller creates, and stores in the memory part, a status information object that represents the status information of the image forming apparatus in the normal mode under which image formation is allowed, and
   the communication part sends the status information object stored in the memory part and the status information update request that has not been reflected in the status information, when status information reference request is received from the external device in a state where operation of the image processing part is restricted under the power saving mode.

5. The image forming apparatus according to claim 4, wherein
   the client application object causes the status information update request to be reflected in the status information sent by the communication part, and causes the status information in which the status information update requested is reflected to be outputted, and
   the communication part sends the status information and the status information update request that has not been reflected in the status information, after the client application object stored in the memory part is sent, when the status information reference request is received from the external device in a state where the operation of the image processing part is restricted under the power saving mode.

6. An image forming system, comprising:
   the image forming apparatus according to claim 1; and
   the external device that communicates with the image forming apparatus, wherein
   the external device includes:
      a receiving part that receives a client application object,
      a display part that analyzes the received client application object and displays at least a part of the status information,
      an input part that accepts a modification to the status information displayed on the display part, and
      a sending part that sends the status information update request accepted via the input part to the image forming apparatus.

7. The image forming apparatus according to claim 2, wherein
   the communication part includes a network controller part that compares time of the status information of the image forming apparatus with time of status information retained in the communication part,
   the client application object causes the status information of the image forming apparatus to be sent to the external device if the status information retained in the communication part is older than the status information of the image forming apparatus in view of the time of the status information of the image forming apparatus and the time of the status information retained in the communication part, and
   the client application object causes the status information retained in the communication part to be sent to the external device if the status information retained in the communication part is not older than the status information of the image forming apparatus in view of the time of the status information of the image forming apparatus and the time of the status information retained in the communication part.

8. An image forming apparatus that is configured using status information, comprising:
   a communication part that performs communication with an external device via a network, the communication part including a memory that stores the status information of the image forming apparatus;
   an image processing part that performs a process for forming an image;
   an image forming part that forms the image on a recording medium based on the process for forming the image by the image processing part; and
   a power supply controller that supplies power to the communication part, the image processing part and the image forming part during a normal mode and that supplies the power to only the communication part during a power saving mode without supplying the power to the image processing part and the image forming part, wherein the communication part sends a client application object to the external device upon acceptance of an access requested from the external device, the communication part sends the status information to the external device upon receipt of a status information acquisition request from the external device through the client application object, when the communication part receives a status information update request from the external device through the client application object during the power saving mode, the communication part modifies the status information stored in the memory, and when the power saving mode is shifted to the normal mode, the image forming apparatus is configured using the modified status information stored in the memory.

9. A network controller for controlling communication between an image forming apparatus that is configured using status information, and an external device, comprising:

a network controller part for receiving and responding to requests from the external device;

a program storage part in communication with the network controller part for storing a program utilized by the network controller part for receiving and responding to the requests from the external network device; and a memory for storing the status information of the image forming apparatus to enable the status information be received from and sent to the external network device while the image forming apparatus is in a power saving mode, wherein while the image forming apparatus is in the power saving mode:

the memory stores a client application object utilized for communication sending the status information to and receiving a status information update request from the external device, and the network controller:

sends the client application object to the external device upon acceptance of an access requested from the external device, sends the status information to the external device upon receipt of a status information acquisition request from the external device through the client application object, and receives the status information update request from the external device through the client application object and modifies the status information stored in the memory based on the received status information update request, and when the power saving mode is shifted to a normal mode, the image forming apparatus is configured using the modified status information stored in the memory.

10. The network controller according to claim 9, wherein the network controller part, the program storage part and the memory are located within the image forming apparatus.

11. The network controller according to claim 9, wherein only the network controller part, the program storage part and the memory receive power supply while the image forming apparatus is in the power saving mode.

12. The image forming apparatus according to claim 1, wherein
the status information of the image forming apparatus that is stored in the memory part is modified based on the status information update data.

13. The image forming apparatus according to claim 8, wherein
the status information of the image forming apparatus that is stored in the memory is modified based on the status information update request.

14. The network controller according to claim 9, wherein the network controller modifies the status information stored in the memory based on the status information update request.

15. The image forming apparatus according to claim 1, wherein
when a status information acquisition request is received from the external device, the status information in which the status information update data has been reflected is sent to the external device.

16. The image forming apparatus according to claim 8, wherein
when a status information acquisition request is received from the external device, the status information in which the status information update request has been reflected is sent to the external device.

* * * * *